April 17, 1956  B. F. RAYNES  2,741,832
METHOD OF FORMING A SMOOTH WELDED SEAM
Filed Oct. 26, 1951

B. F. RAYNES
INVENTOR.

BY S. Tierney Jr.
ATTORNEY

United States Patent Office 2,741,832
Patented Apr. 17, 1956

2,741,832

METHOD OF FORMING A SMOOTH WELDED SEAM

Burt F. Raynes, Chula Vista, Calif., assignor to Rohr Aircraft Corporation, Chula Vista, Calif., a corporation of California Application October 26, 1951, Serial No. 253,387

1 Claim. (Cl. 29—493)

This invention relates to metal welding and particuarly to a method for forming a smooth welded seam.

An object of the invention is to provide a method for forming a welded seam which is smooth and even throughout its length.

A further object is to provide a method for welding the two edges of a sheet metal tube together to form a continuous seam and for smoothing the seam in such a manner that the full thickness of the tube is maintained at both ends of the seam.

Other objects will become apparent as the description proceeds. For a better understanding of the invention, reference is made to the accompanying drawings, in which.

Figure 1:
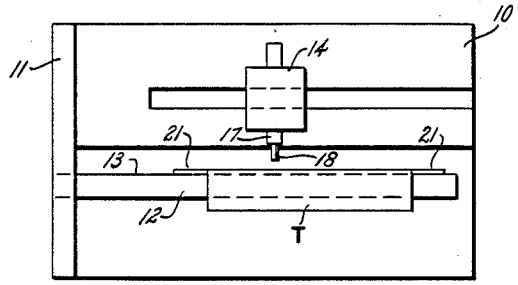
Figure 1 is a schematic view of a tube welding machine and a tube in process of being welded.
Figure 2:
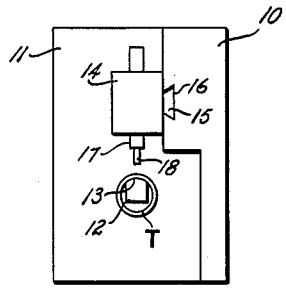
Figure 2 is an end view, partly schematic, of the structure shown in Figure 1.

The welding machine shown schematically in Figures 1 and 2 comprises a main supporting frame 10 having at one end a projecting wall 11 from which extends a tube support 12 having a curved upper face, as indicated at 13, which is adapted to engage the inner surface of the tube T which is to be welded. The machine also comprises a carriage 14 having a projecting guide 15 slidable in a guideway 16 in frame 10, guideway 16 being parallel to face 13 of support 12. Carriage 14 carries a welding member 17 having a tip 18 which travels along just above or in contact with tube T and effects the welding. In gas welding, member 17 is supplied with a combustible mixture of gases suitable for the particular type of tube to be welded and, in electric welding, it is supplied with electric current of suitable amplitude, this invention not being restricted to any particular type of welding. Also, in the case of welding certain metals, an inert gas such as helium or argon may be supplied in a known manner at the region of the weld to prevent the oxidation of the hot metal with the attendant formation of undesirable scale. The connections for supplying the gases or electric current to welding member 17 are omitted from the drawing for clarity and also since they are well known to those skilled in the welding art.

Figure 3:
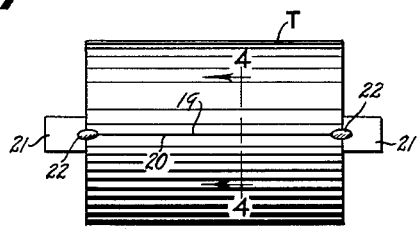
Figure 3 is a front view of a tube just after the welding is completed.
Figure 4:
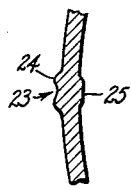
Figure 4 is a sectional view on the line 4—4 of Figure 3 showing a portion of the tube at the welded seam on an enlarged scale.

Tube T may be formed of sheet metal as, for example, stainless steel which has been previously cut from flat sheet stock and bent into cylindrical or other desired shape. The tube is slipped over support 12 into the position shown and its edges 19 and 20 held together. A short metal tab 21 is then welded to each end of the tube, the thickness of the tabs preferably being the same as that of the tube stock. In the example illustrated in Figures 3 and 4, this welding resulted in a small metal deposit extending a few thousandths of an inch above the top surfaces of the tube and each tab, and merging with their top surfaces along the closed curves 22. The attached tabs hold the abutting edges 19—20 of the tube together and, starting the weld at one end of the tube, carriage 14 is now moved slowly along guideways 16 to advance welding tip 18 to the other end of the tube and complete the weld. It is found that a welded seam 23 so produced is not even and smooth but has irregularities, as indicated at 24 and 25 in Figure 4, which are more or less curved and rise a small fraction of an inch above the level of the adjacent tube surface. In some instances small portions of these irregularities are found to extend slightly below the level of the adjacent tube surface.

Figures 5, 6:
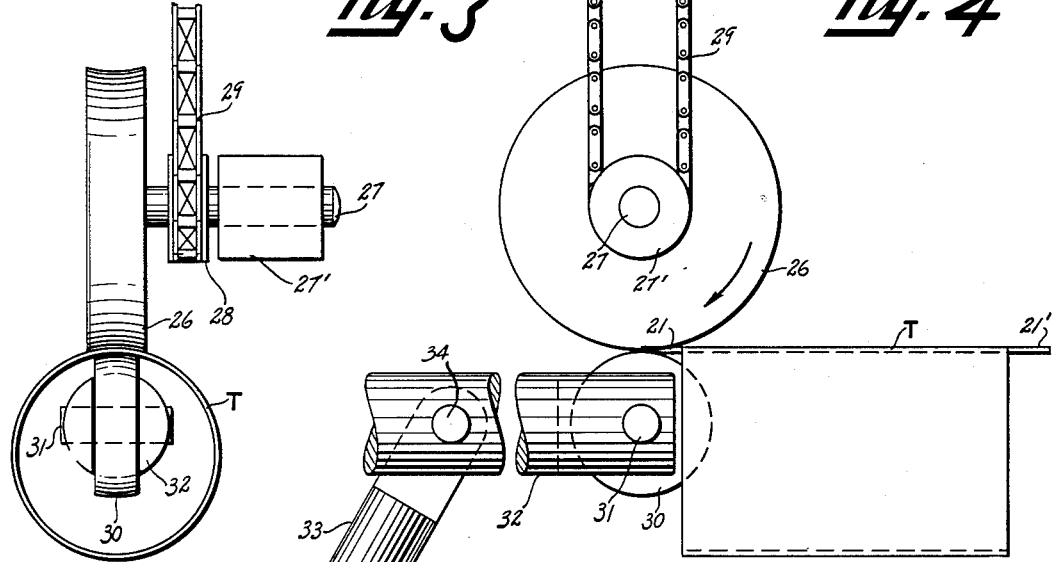
Figure 5 is a front view showing portions of a machine for smoothing the welded seam of a tube; and, Figure 6 is a side view of the machine and tube of Figure 5.

The removal of all such irregularities and the production of a smooth, even seam is accomplished in the machine shown in Figures 5 and 6. This comprises a feed roll 26 mounted on a shaft 27 journaled in a fixed bearing 27' and which is driven by a sprocket gear 28 and chain 29. Below feed roll 26 an idler roll 30 is supported for free rotation on a short shaft 31 carried by one end of a lever 32, the other end of which is not shown. Lever 32 is raised or lowered at the will of the operator by means of a push rod 33 whose lower end (not shown) is driven by a cam or crank mounted on a power driven shaft (not shown). Push rod 33 is connected to lever 32 by a pivot pin 34.

In the operation of the machine, the operator places the end portion of a tab 21 on the top of idler roll 30 and causes rod 33 to elevate lever 32 so as to bring the top of tab 21 into firm and driving engagement with feed roll 26. Rotation of this roll in the direction indicated by the arrow, causes the leading tab 21, seam 23 and the trailing tab 21' to pass successively between the rolls where sufficient pressure is applied to depress the metal at the high points along seam 23 and produce a smooth, even seam which is substantially level with the inner and outer surfaces of the tube. If, due to the hardness of the welding metal or for other reasons, one pass of the tube through the machine does not produce a sufficiently smooth and even finish to the seam, the operation may be repeated until the desired finish is secured. Usually, however, one pass is sufficient to produce a smooth seam.

In the absence of tabs 21, when the end of a welded tube is placed between rolls 26 and 30 and a high pressure applied and the seam rolled, it is found that the metal of the tube itself at both ends is reduced in thickness somewhat. Also the tube tends to crack open at both ends of the seam with resultant weakness in these regions. These undesirable features are prevented by the use of metal tabs in the manner above described, the pressure rolls 26—30 passing smoothly from tab 21, onto the tube and from the trailing end of the tube onto tab 21' without any change in distance between the rolls.

While the invention has been illustrated in connection with welding together the edges of a tube, it is equally well adapted to welding together the edges of two separate metal parts which may be either curved or flat. The term "parts" is accordingly to be understood as including portions of a single member or two separate members.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claim, and all changes which come within the meaning and range of equivalency of the claim are intended to be embraced therein.

Having thus described my invention, what I claim as new and useful and desire to secure by Letters Patent is:

The method of forming a smooth welded seam for fastening together the edges of a metal tube having a curved wall which comprises the steps of abutting the edges together; holding the ends of metal tabs of substantial width and having a uniform thickness substantially equal to the thickness of the tube wall against the ends of the tube at the line of abutment and with the entire upper surfaces of the tabs substantially tangent to the peripheral surface of the tube, the length of said tabs in the direction of said abutting edges being greater than twice the thickness of the tube wall; welding said metal tabs to the ends of said tube to provide tab portions projecting outwardly from the ends of the tube and to hold the abutting edges together; welding the abutting edges of the tube together to form a continuous seam extending the entire length of the tube; entering the leading end of one tab between a feed roll and an idler roll; pressing the rolls against the opposite faces of said tab at its leading end; and rotating the feed roll to advance said one tab, the seam and the second tab consecutively between the rolls while continually applying pressure to the rolls.

References Cited in the file of this patent

UNITED STATES PATENTS

| | | |
|---|---|---|
| 1,512,787 | Morton | Oct. 21, 1924 |
| 1,611,875 | Belmont | Dec. 28, 1926 |
| 1,834,244 | Hume | Dec. 1, 1931 |
| 1,983,930 | Carlsen | Dec. 11, 1934 |
| 2,219,085 | Watson | Oct. 22, 1940 |
| 2,329,938 | Ortiz | Sept. 21, 1943 |
| 2,649,528 | Koenig et al. | Aug. 18, 1953 |